(No Model.)
C. H. CAMPBELL.
BICYCLE REST.
No. 535,160. Patented Mar. 5, 1895.
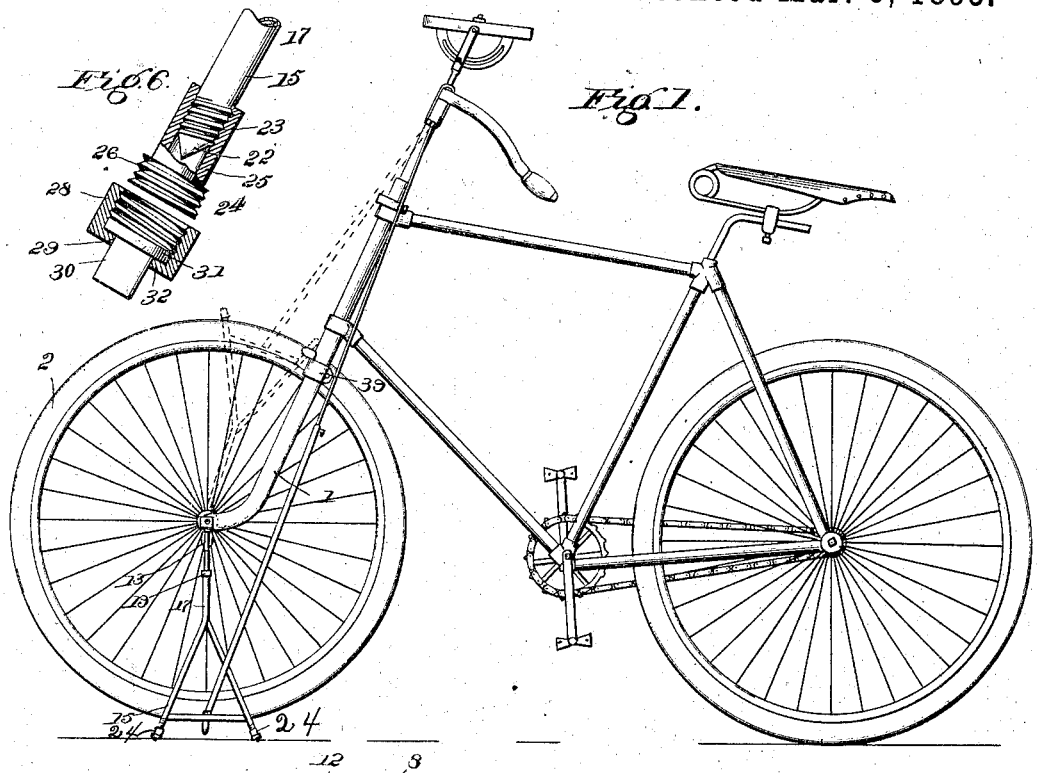
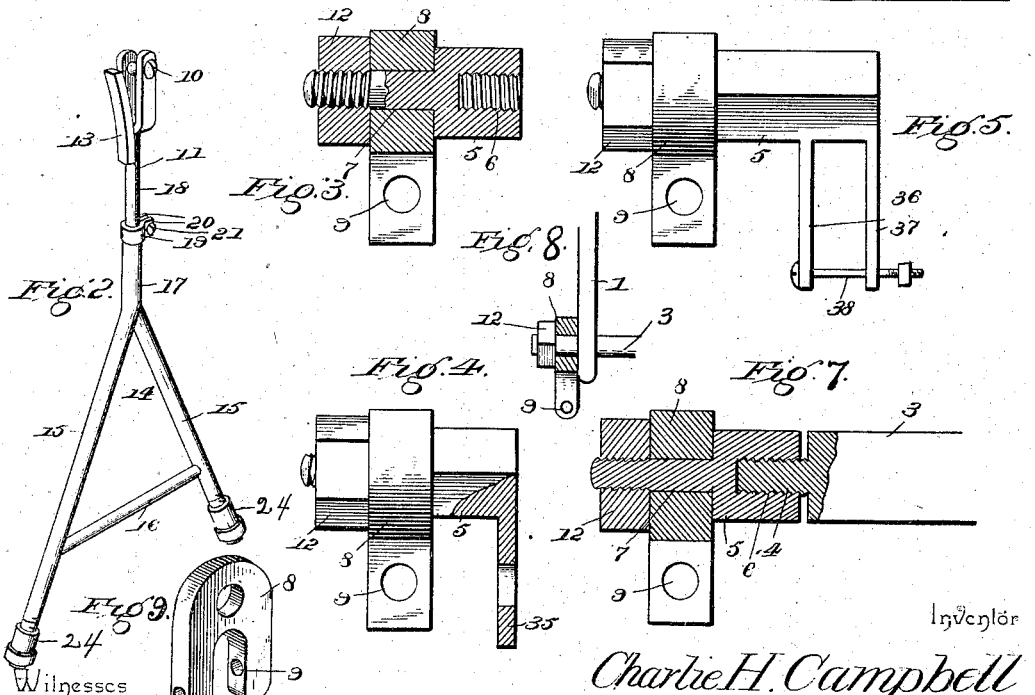
Witnesses
T. M. Johnson
C. E. Doyle
Inventor
Charlie H. Campbell
By his Attorneys
C. A. Snow & Co.

United States Patent Office.

CHARLIE H. CAMPBELL, OF OCALA, FLORIDA.

BICYCLE-REST.

SPECIFICATION forming part of Letters Patent No. 535,160, dated March 5, 1895.

Application filed July 24, 1893. Serial No. 481,293. (No model.)

*To all whom it may concern:*

Be it known that I, CHARLIE H. CAMPBELL, a citizen of the United States, residing at Ocala, in the county of Marion and State of Florida, have invented a new and useful Bicycle-Rest, of which the following is a specification.

My invention relates to a bicycle rest, and has for its object to provide a simple and efficient rest capable of being applied to any ordinary safety bicycle, and capable of being folded to occupy a position in which it is out of the way of the rider, and furthermore, to provide means whereby, when the rest is in its operative position, the front or steering wheel of the bicycle may be elevated or removed from contact with the ground.

Further objects and advantages of this invention will appear in the following description, and the novel features thereof will be particularly pointed out in the appended claim.

In the drawings: Figure 1 is a side view of a safety bicycle provided with a rest embodying my invention, said rest being shown in full lines in its operative position and in dotted lines in its folded position. Fig. 2 is a detail view in perspective of the rest. Fig. 3 is a view of the stub-shaft which is secured to the threaded extremity of the axle in lieu of the ordinary adjusting nut. Fig. 4 is a view of a stub-shaft provided with different means for attachment to the axle. Fig. 5 is a view of another modified form of stub-shaft, which is adapted to be secured to the fork adjacent to the axle of the steering wheel. Fig. 6 is a detail view, partly in section, of one of the feet of the rest, to show the manner of securing the rubber cushion thereto. Fig. 7 is a detail sectional view, taken transversely of the steering-wheel to show the manner of attaching the stub-shaft to the axle thereof. Fig. 8 is a section showing the application, and Fig. 9 is a detail of a modified form of attachment for the rest, in which the stub-shaft is omitted.

Similar numerals of reference indicate corresponding parts in all the figures of the drawings.

1 designates the front or steering fork of a bicycle; 2, the front or steering wheel, and 3 the axle thereof. Ordinarily the outer threaded end 4 of this axle is fitted with a securing nut, not shown in the drawings, to bear against the outer surface of the fork, but in lieu thereof I provide a stub-shaft 5, provided with a socket 6, having a threaded bore to fit upon said threaded extremity of the axle and having an angular exterior surface to enable this attachment to be applied and driven to place by means of a wrench or similar tool. Rotatably mounted upon the smooth portion 7 of the stub-shaft is an eye 8, provided with a perforated ear 9, to which is swiveled, by means of a transverse pivot-bolt 10, the upper bifurcated end of the stem 11 of the rest. A retaining nut 12 is threaded upon the extremity of the stub-shaft to hold the said eye in place; and the stem of the rest is provided, upon its outer side, with a stop-arm 13, which is adapted to engage said retaining nut to limit the outward movement of the lower end of e rest.

The body-portion 14 of the rest is V-shaped, having the downwardly-divergent legs 15, which are connected, near their lower extremities, by a horizontal brace 16; and the stem 11, which connected to the body-portion at the point of intersection of the said legs, comprises relatively-adjustable sections or members, of which the lower member 17 is tubular to receive the upper member 18. These sections or members are held at the desired relative adjustment by means of a clamp 19, consisting of a band which encircles the split upper end of the tubular section or member 17, and is provided with the parallel perforated ears 20, connected by an adjusting screw 21. In lieu of this clamping device an ordinary set-screw may be employed to engage the inclosed member or section 17 by impinging against the surface of the same, but this construction is common in the telescoping sections of other devices, and therefore I have thought it unnecessary to illustrate the same.

The lower extremities or feet of the body portion of the rest are tapered or pointed, as shown at 22, and the contiguous portions of said feet are exteriorly threaded, as shown at 23.

24 represents a coupling, comprising the upper member 25, which is threaded upon the portion 23 of the foot, and a lower member or cap-portion which is adapted to be fitted upon the exteriorly-threaded portion 26 of the upper member. This cap-portion 28 is provided in its lower side with an opening 29, to receive the cushion 30, of rubber or similar material, said cushion being provided with an enlargement or head 31, to lie within the cap-portion of the coupling with its shoulder in contact with the annular flange 32, around the opening 29. When the portions or members of the coupling are united, the lower end of the upper tubular member bears upon the upper surface of the cushion, thereby holding the latter firmly in place.

In the drawings I have also shown modified means for attaching the stub-shaft to the bicycle when it is inconvenient or inexpedient to employ the socket construction hereinbefore described. In Fig. 4 the stub-shaft is provided with a depending perforated ear 35, to fit upon the projecting end of the axle and adapted to be held in place by means of the ordinary nut which is employed to connect the axle and forks. In Fig. 5 I have shown still another means for attaching the stub-shaft to the machine, consisting of a spring clamp 36, the arms 37 of which are adapted to pass upon opposite sides of the fork adjacent to the center of the wheel, and are connected for adjustment by the bolt 38. Fixed to the fork at a suitable point above the lower end thereof is a spring-clamp 39, to engage one leg of the rest when the latter is elevated to its folded position, as shown in dotted lines in Fig. 1.

This being the construction of the improved rest, the operation thereof, briefly stated, is as follows: When it is desired to bring the rest to its operative position it is disengaged from the holding clamp 39 and allowed to swing forwardly and downwardly until it contacts with the ground in front of the wheel, when the bicycle is moved forwardly to bring both feet of the rest squarely upon the ground, thus elevating the front or steering wheel of the bicycle to the position shown in Fig. 1.

It will be understood that the construction which I have described is duplicated upon the opposite side of the machine, and hence, by means of the pivotal connection of the stems of the rests to the stub-shafts, the lower ends of the rests may be separated or spread to from a broad and safe base for the machine.

To fold the rests the machine is moved backwardly until the steering-wheel descends and rests upon the ground, when the supporting devices may be moved upwardly until engaged with the clamps 39.

From the above description it will be apparent that the improved rest is permanently connected to the bicycle by simple and readily-adjustable means, that it is disposed at the front end of the machine, and substantially concentric with the front or steering wheel, that it is capable of connection in the manner described to any machine irrespective of the construction of the framework thereof, and that whether in its operative or folded position it is out of the way of the rider. Thus it will be seen that the rest comprises twin parts or members, which are disposed upon opposite sides of the plane of the steering-wheel, each part or member consisting of a stem which is bifurcated to form downwardly divergent legs, which are arranged in planes parallel with the plane of the steering-wheel. Therefore, the rest contacts with the surface of the ground at four different points, the points of contact upon each side of the plane of the wheel being respectively in front and in rear of a vertical plane embracing the axis of such wheel, whereby when the rest is in position the front wheel of the machine is supported clear of the ground and is held from forward and backward movement.

Various changes in the form, proportion, and the minor details of construction may be resorted to without departing from the principle or sacrificing any of the advantages of this invention.

Having described my invention, what is claimed as new is—

A bicycle rest provided with threaded lower extremities or feet, in combination with a cushion, and means for securing the cushion to the extensions or feet such means comprising a coupling having an upper tubular portion adapted to be threaded upon the extension, and a hollow cap interiorly bored to receive an exteriorly-threaded portion of said upper section and provided in its lower side with an opening to receive the cushion, said cushion being shouldered to engage an annular flange around the opening in the cap, substantially as specified.

In testimony that I claim the foregoing as my own I have hereto affixed my signature in the presence of two witnesses.

CHARLIE H. CAMPBELL.

Witnesses:
R. M. O'CONNELL,
C. E. CONNOR.